United States Patent [19]

Lotz

[11] Patent Number: 4,501,624
[45] Date of Patent: Feb. 26, 1985

[54] FLAME-CUTTER EMPLOYING A DISCONTINUOUS OXYGEN SUPPLY FOR BILLETS PRODUCED IN A CONTINUOUS CASTER

[75] Inventor: Horst K. Lotz, Wiesbaden-Delkenheim, Fed. Rep. of Germany

[73] Assignee: Aute Gesellschaft für autogene Technik mbH, Zurich, Switzerland

[21] Appl. No.: 534,328

[22] Filed: Sep. 21, 1983

[30] Foreign Application Priority Data

Mar. 29, 1983 [DE] Fed. Rep. of Germany ... 8309304[U]

[51] Int. Cl.³ .............................................. B23K 7/02
[52] U.S. Cl. ...................................... 148/9 R; 266/50
[58] Field of Search .................... 266/50, 49; 148/9 R

[56] References Cited

U.S. PATENT DOCUMENTS

| 4,303,227 | 12/1981 | Dompas | 266/50 |
| 4,385,750 | 5/1983 | Hennecke | 266/50 |
| 4,441,934 | 4/1984 | Kawakami | 148/9 R |

Primary Examiner—W. Stallard
Attorney, Agent, or Firm—Spencer & Frank

[57] ABSTRACT

A flame-cutter for separating a moving billet produced by a continuous caster wherein the billet is supported by at least one billet supporting roller. The flame-cutter includes a burner having a nozzle supported for synchronous movement with the billet, means for supplying oxygen to the billet and means for interrupting the supply of oxygen to the burner when the burner passes over each of the billet supporting rollers. Means are also provided for reducing the amount of oxygen escaping from the nozzle after interruption of the supply of cutting oxygen thereby minimizing damage to the supporting rollers and permitting a narrow optimized groove to be cut in the billet.

18 Claims, 5 Drawing Figures

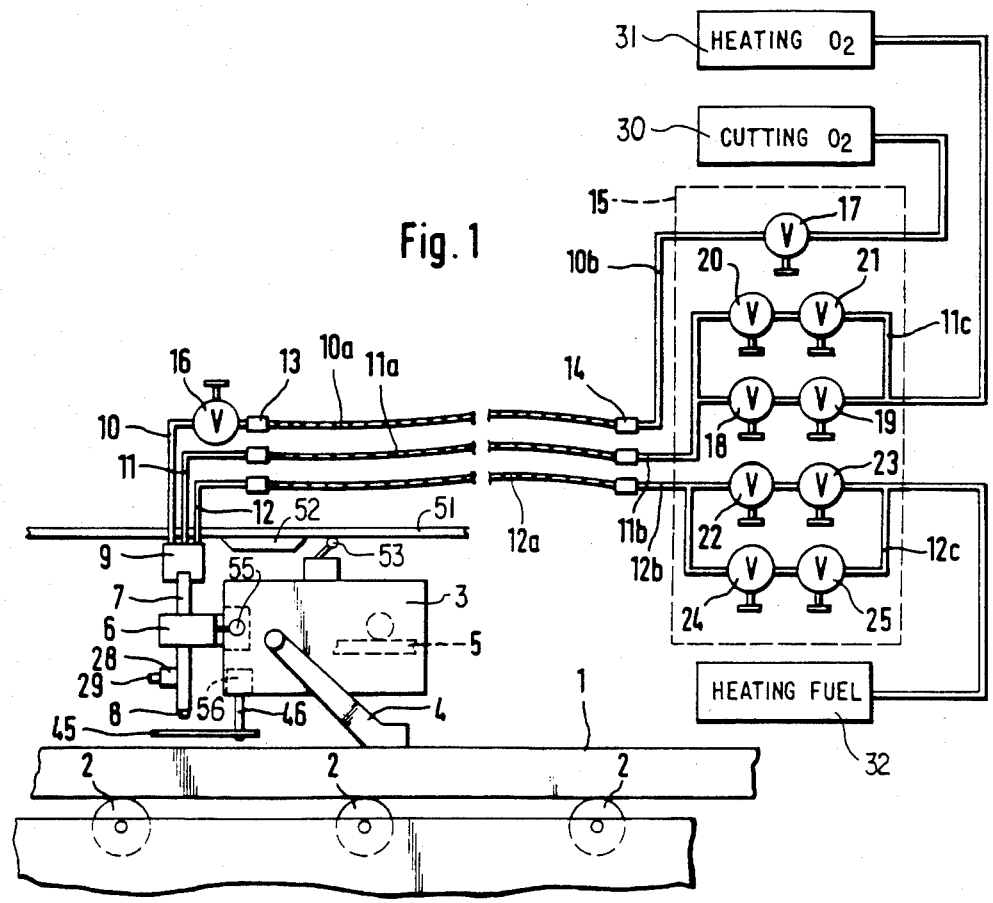

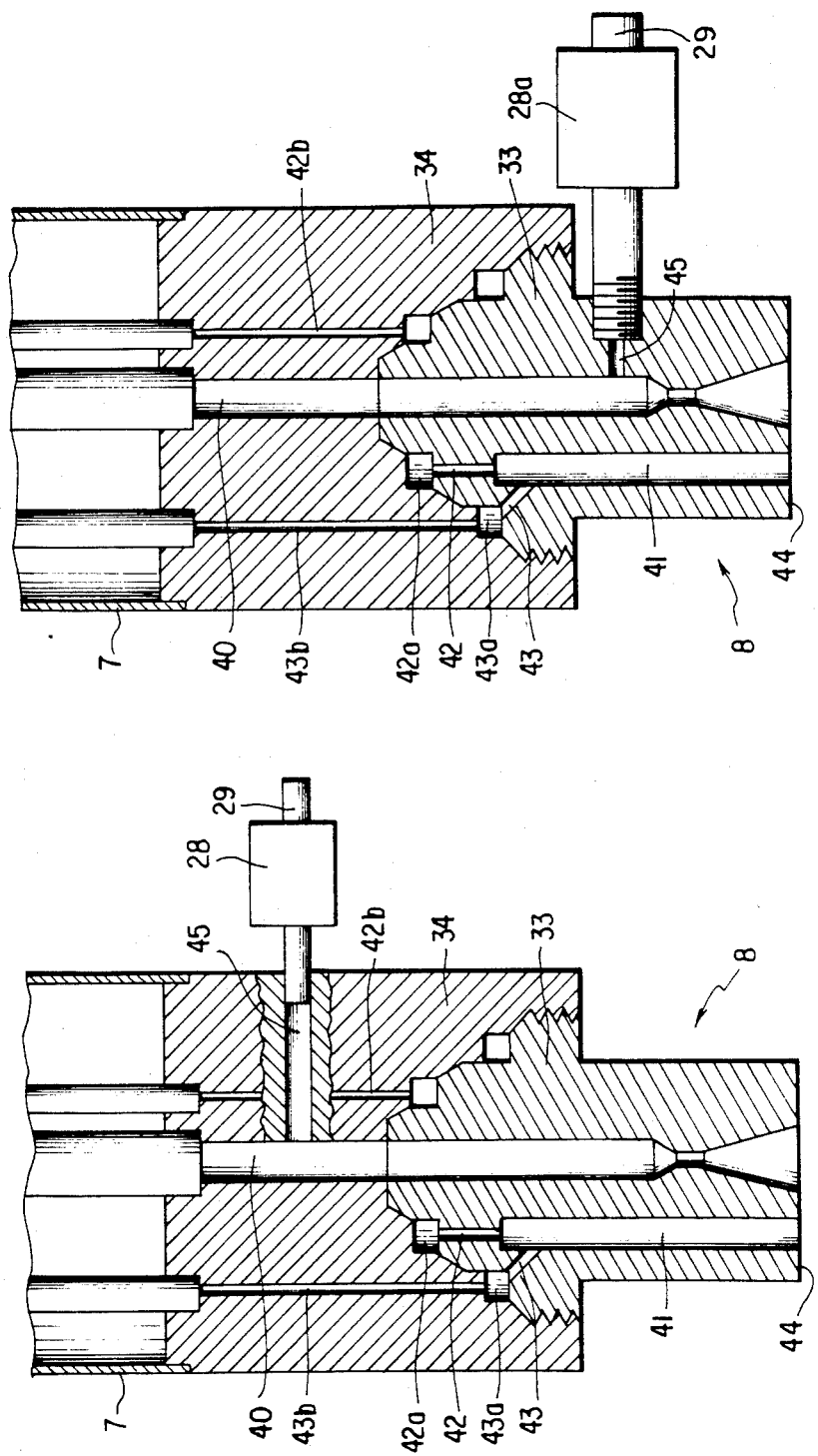

4,501,624

FLAME-CUTTER EMPLOYING A DISCONTINUOUS OXYGEN SUPPLY FOR BILLETS PRODUCED IN A CONTINUOUS CASTER

BACKGROUND OF THE INVENTION

The present invention relates to a flame-cutter for separating billets produced in a continuous caster wherein, during the separation process, the flame-cutter moves on a flame-cutting path in the direction of billet advance. The supply of oxygen for the flame-cutting process and, if desired, the heating flame supply are temporarily interrupted when the flame-cutter enters the region adjacent a support roller for the roller bed.

When a billet is cut by means of a flame-cutter, there is a tendency for the support rollers, on which the billet moves and on which it is supported over its entire width, to be damaged by the cutting process. To prevent such damage, each roller may be moved away from the billet by lowering it as the flame-cutter approaches the region in which the roller is located. However, the billet is then temporarily without support in the region where a roller has been withdrawn so that it is necessary for successive support rollers to be more closely spaced than would otherwise be the case. Moreover, the devices required to lower the support rollers are relatively expensive.

It is also known to substitute for the support rollers relatively short roller sections mounted on a shaft. The supporting width of a roller section takes up only a fraction of the width of the billet, and therefore the flame-cutter can cut the billet in the spaces between the supporting roller sections. This method has the disadvantage that complicated control devices are required, and the rollers may be damaged if for some unforeseen reasons the cutter deviates from its intended path.

A method which has the advantage of being relatively inexpensive is to temporarily interrupt the supply of flame-cutting oxygen in the region of a support roller in the roller bed and, if desired, also interrupt the supply to the heating flame. In this case, a normal roller bed with support rollers which support the slab can be operated without damaging the support rollers during the cutting process. A disadvantage to this method, as carried out prior to this invention, is that the grooves cut by the flame-cutter tend to vary in shape and, in particular, are wider than grooves cut where this method is not employed.

SUMMARY OF THE INVENTION

It is an object of the present invention to provide a billet flame-cutter wherein, despite temporary interruption of the supply of cutting oxygen, there is little variation in, and particularly no broadening of, the shape of the groove cut by the flame-cutter.

More specifically, in accordance with the present invention, after the flame-cutting oxygen is shut off, the usual after-flow of flame-cutting oxygen is substantially avoided or reduced to a minimum. This is accomplished by providing a shut-off valve in the flame-cutting oxygen line between an electrical control panel and the burner, the shut-off valve being as close as possible to the opening of the cutting oxygen inlet opening into the burner. This shut-off valve, placed in the cutting oxygen line upstream of the burner, may be actuated by an electromagnetic remote control device.

In order to further reduce the after-flow of cutting oxygen, an additional feature of the invention is to provide a fast-venting valve in the cutting oxygen line between the shut-off valve and the nozzle outlet. This fast-venting valve opens when the pressure drops due to the cutting oxygen supply being cut off. The fast-venting valve may be disposed in the burner, upstream of the nozzle, or in the flame-cutting nozzle itself. The cutting oxygen inlet opens into a short nozzle; that is, a nozzle having about one-third the axial length of a concentric nozzle. The short nozzle emits a cutting jet that is narrow compared to that of conventional nozzles and results in a narrow groove being cut in the billet.

A feature of the invention is that the supply lines for the heating oxygen and the heating fuel gas are each provided with a bypass conduit having a shut-off valve and a pressure reducing regulating valve. The bypass shut-off and regulating valves are in parallel with the main pressure reducing regulating valves used for normal operation together with their associated series-connected shut-off valves. If there is an interruption in the cutting oxygen supply, the main heating oxygen and fuel shut-off valves are closed and the bypass shut-off valves opened to provide a reduced supply of heating oxygen and fuel.

In accordance with a further feature of the invention, apparatus is provided for moving the burner so as to separate the after-flowing cutting oxygen from the previous cutting location. The movement of the burner is in a desired direction at a speed faster than the cutting speed thereby causing the flame to break off, the burner being returned to its original position simultaneously with the cutoff of the cutting oxygen. The burner may also be pivoted to the side or displaced so as to reduce the amount of after-flowing cutting oxygen at the cutting location and make it ineffective, this being accomplished, for example, by raising the burner.

In accordance with still another feature of the invention, a mechanical cutting oxygen deflector is moved into the stream of oxygen. This deflector is, for example, in the form of a metal deflector sheet which is pushed or pivoted into the oxygen stream.

In a further feature of the invention, devices are provided in the region of the support rollers of the roller bed which automatically actuate the shut-off and turn-on of the cutting oxygen, the movement of the burner and the devices for deflecting, retracting and restoring the cutting oxygen stream.

In summary, the invention comprises a flame-cutter for separating a moving billet produced by a continuous caster wherein the billet is supported by at least one billet supporting roller. The flame-cutter includes a burner having a nozzle supported for synchronous movement with the billet, means for supplying oxygen to the billet and means for interrupting the supply of oxygen to the burner when the burner passes over each of the billet supporting rollers. Means are also provided for reducing the amount of oxygen escaping from the nozzle after interruption of the supply of cutting oxygen thereby minimizing damage to the supporting rollers and permitting a narrow optimized groove to be cut in the billet.

BRIEF DESCRIPTION OF THE DRAWINGS

FIG. 1 is a schematic representation of a flame-cutter with its associated oxygen and fuel supply lines.

FIGS. 2A, 2B and 2C illustrate three embodiments of the burner of FIG. 1 with fast-venting valves for the cutting oxygen located in different positions.

DESCRIPTION OF THE PREFERRED EMBODIMENTS

Figure 2C:
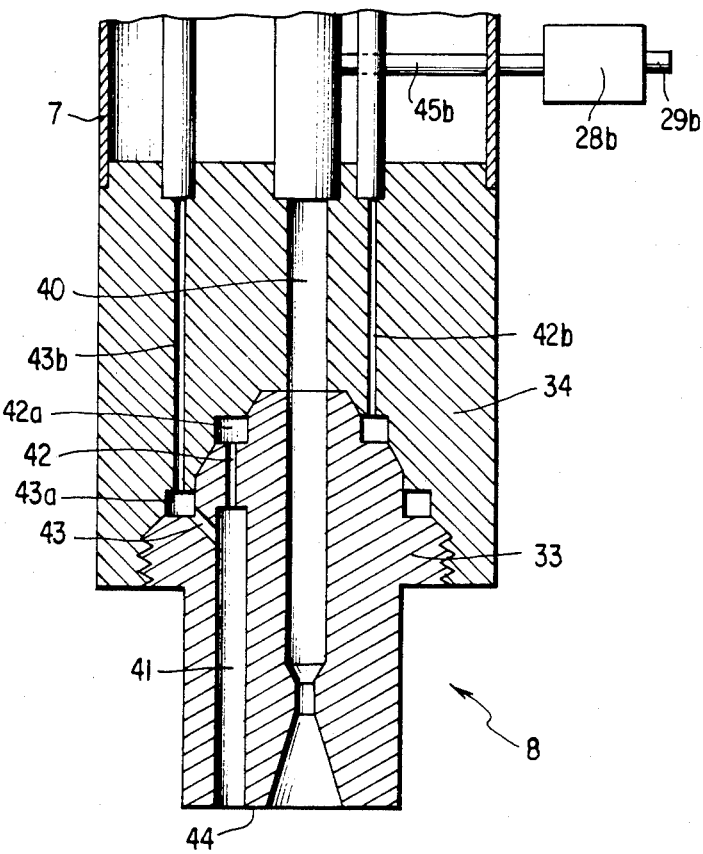

Referring to FIG. 1, there is shown a cast billet 1 which is movable from right to left in the drawing on support rollers 2 of a roller bed (not shown in detail). A flame-cutter unit 3 is attached to a clamping lever 4 which is in friction contact with the surface of billet 1, the contact face between lever 4 and billet 1 being adjustable if desired. The flame-cutter unit 3 is moved in synchronism with billet 1 on rails 5, shown by dashed lines in FIG. 1. Alternatively, flame-cutter unit 3 may be attached directly to billet 1, or other known means may be used to provide synchronous movement between the flame-cutter unit and billet. A burner 7 is attached by a mount 6 to unit 3, the lower end of burner 7 having a nozzle 8 through which exits a gas jet for cutting the slab 1.

A control rail 51 is mounted above the flame-cutter unit 3 and is provided with a cam 52 for each of the rollers 2. A sensor 53 is displaced downward when burner 7 and its nozzle 8 pass through the region of a support roller 2. The sensor 53 actuates a switch arm 54, shown in FIG. 3, the operation of which is described hereinafter.

A burner head 9 is located at the upper end of burner 7 opposite nozzle 8. Rigid conduits 10, 11 and 12 are provided for connecting the cutting oxygen, heating oxygen and heating fuel, respectively, to the burner head 9. The rigid gas conduits 10, 11 and 12 are connected by sleeves 13 to the ends of gas hoses 10a, 11a and 12a respectively, gas hoses 10a, 11a and 12a being supported by drag chains (not shown) which permit movement of burner 7 together with billet 1 during the cutting process.

At the other ends of gas hoses 10a, 11a and 12a there are sleeves 14 which connect the gas hoses to respective rigid control panel conduits 10b, 11b and 12b. The control panel conduits are brought to a gas control panel 15 where regulating and shut-off valves are mounted for connection to a cutting oxygen source 30, heating oxygen source 31 and a heating fuel source 32. The cutting and heating oxygen sources may be combined, and a fuel such as acetylene is provided by the source 32.

The series-connection of the oxygen burner head conduit 10, gas hose 10a and control panel conduit 10b comprise a cutting oxygen supply line. Similarly, heating oxygen burner head conduit 11, gas hose 11a and control panel conduit 11b comprise a heating oxygen supply line and heating fuel burner head conduit 12, gas hose 12a and control panel conduit 12b comprise a heating fuel supply line.

A solenoid-actuated shut-off valve 16 is located immediately upstream from burner head 9 in the rigid cutting oxygen conduit 10, and a regulating valve 17 is disposed in the cutting oxygen conduit 10b in control panel 15. The heating oxygen conduit 11b in control panel 15 has a bypass conduit 11c, and correspondingly the heating fuel conduit 12b in gas control panel 15 is provided with a bypass conduit 12c.

Bypass conduit 11c of the heating oxygen conduit 11b bypasses a solenoid actuated main shut-off valve 18 and series-connected main control or regulating valve 19, bypass lines 11c having a series-connected solenoid-actuated bypass shut-off valve 20 and a bypass control or regulating valve 21. Similarly, bypass conduit 12c of heating fuel conduit 12b bypasses a series-connected main solenoid-actuated shut-off valve 22 and main control or regulating valve 23, and is provided with a series-connected solenoid-actuated bypass shut-off valve 24 and a bypass control or regulating valve 25.

During the cutting process, shut-off valve 16 in cutting oxygen burner head conduit 10 is open and cutting oxygen is supplied to burner 7 via control panel conduit 10b, gas hose 10a and burner head conduit 10 in a quantity set by valve 17 in gas control panel 15. Shut-off valve 18 in heating oxygen supply conduit 11b is also open and burner head 9 is supplied with heating oxygen via control panel conduit 11b, gas hose 11a and burner head conduit 11 in a quantity set by regulating valve 19 in gas control panel 15. Similarly, heating fuel is supplied through the heating fuel line to burner head 9, shut-off valve 22 being open and the desired quantity of heating gas being set by regulating valve 23 in heating gas conduit 11b of control panel 15.

When burner 7 and its nozzle 8 approach the region of support roller 2, sensor 53 is actuated causing the solenoid-actuated remote controlled shut-off valve 16 in cutting oxygen conduit 10 to close thereby interrupting the cutting process. At the same time, shut-off valve 18 in heating oxygen supply conduit 11b is closed and shut-off valve 20 in bypass conduit 11c, which had previously been closed, is opened. Only a reduced stream of heating oxygen is permitted to pass through the heating oxygen supply line into burner head 9 because regulating valve 21 in the open bypass line 11c is set to a predetermined flow of heating oxygen which is below the setting of regulator 19.

At the same time, when the cutting process is interrupted, shut-off valve 22 in heating fuel conduit 12b is closed and shut-off valve 24 in bypass conduit 12c opened so that a heating fuel stream, reduced to a predetermined amount by regulating valve 25 in bypass conduit 12c, reaches the burner head through conduit 12. In this way, the burner is supplied with only enough fuel for a reduced flame which functions as a pilot flame, and the burner remains practically inoperative until nozzle 8 leaves the region of supporting roller 2.

As nozzle 8 leaves the vicinity of roller 2, sensor 53 is displaced upward as it rolls off the cam 52, shut-off valve 16 in cutting oxygen burner head conduit 10 is opened, shut-off valves 20 and 24 in heating oxygen and fuel bypass conduits 11c and 12c are closed and heating oxygen and fuel main valves 18 and 22 opened. The flame, which has been reduced during the pause in the cutting process, now receives a full gas supply and the cutting process continues.

In order to minimize the outflow of cutting oxygen, a fast-venting valve 28, which is available commercially from Herion GmbH, Stuttgard and Reyroth, Lohr Main, both of West Germany, is disposed in burner 7 between burner head 9 and nozzle 8. Valve 28 opens when the pressure drops due to the cutting oxygen being cut off by shut-off valve 16. This causes the afterflow of cutting oxygen in nozzle 8 to be substantially reduced because the cutting oxygen flows out to the atmosphere through venting pipe 29 in fast-venting valve 28.

FIG. 2A is a sectional view of the burner 7, a nozzle receptacle 34 attached thereto and a nozzle body 33 screwed into the receptacle 34. A centrally located channel 40 is connected via the burner head 9 to the conduit 10 downstream from the shut-off valve 16. A plurality of gas mixing bores 41 are circumferentially located in nozzle body 33 around the cutting oxygen channel 40 for receiving heating oxygen and fuel. The heating oxygen is obtained from conduit 11 through a heating oxygen supply channel 42b and annular channel 42a, and the heating fuel is obtained from conduit 12 through a heating fuel supply channel 43b and annular channel 43a, connecting channels 42 and 43 coupling annular channels 42a and 43a respectively to the gas mixing bores 41.

Nozzle 33 has an axial length of approximately 30 mm, which is about one-third the length of a conventional nozzle, and is defined as a short nozzle. Conventional nozzles have an axial length in the range from 90 to 120 mm, which length corresponds approximately to the length of the cutting oxygen channel 40.

A fast-venting valve 28 is disposed in the nozzle receptacle 34 and is connected to the cutting oxygen channel 40 by a channel 45. The cutting oxygen escapes through venting pipe 29 once fast-venting valve 28 opens because of the drop in pressure produced by the closing of shut-off valve 16. Typically, the cutting oxygen is introduced at a pressure in the range 18 to 14 atmospheres, valve 28 being adjusted to open when the pressure drops below this range due to the closing of the valve 16.

FIG. 2B is a sectional view similar to FIG. 2A except that a fast-venting valve 28a having a venting pipe 29a is attached by screw threads to the nozzle body 33, and is coupled to the cutting channel 40 by a channel 45a. In principle, the fast-venting valve may be provided in any type of nozzle. However, it is particularly suitable for use with a short nozzle which emits a narrow cutting jet compared to other nozzles and produces a small cut groove in the billet.

FIG. 2C is a sectional view of the burner 7, nozzle receptacle 34 and nozzle body 33 showing an embodiment in which a fast-venting valve 28b having a venting pipe 29b is connected by a channel 45b to channel 40 where it passes through burner 7.

In order to prevent outflowing residual cutting oxygen from changing the shape of the cut groove and, in particular, from broadening it, the burner is also moved relative to the billet to cut off the after-flowing cutting oxygen from its previous cutting location. This is accomplished by moving burner 7 in any desired direction at a speed which is faster than the cutting speed thereby causing the flame jet to break off. That is, simultaneously with cut-off of the cutting oxygen supply by shut-off valve 16, the burner may be pivoted laterally or raised so that the after-flowing cutting oxygen is reduced at the cutting location and made ineffective.

A pivotal movement of burner 7 is provided by pivoting motor 55 located in flame-cutter unit 3. Typically, the speed at which the burner moves to the left in FIG. 1 is 500 mm per minute and, if the speed at which the burner 7 is pivoted is sufficient to increase the burner velocity to 750 mm per minute, the cutting stream will be interrupted.

A further feature of the flame-cutter provides that the cutting oxygen for the oxygen jet is deflected mechanically. For this purpose, a metal deflection sheet 45 is provided which is connected by a shaft 46 with a motor 56 in the flame cutter 3. If the cutting oxygen is shut off by shut-off valve 16, deflection sheet 45 pivots in a horizontal plane around shaft 46 and any remaining oxygen flowing from nozzle 8 is blocked so that it can no longer influence the cut groove in billet 1.

Figure 3:
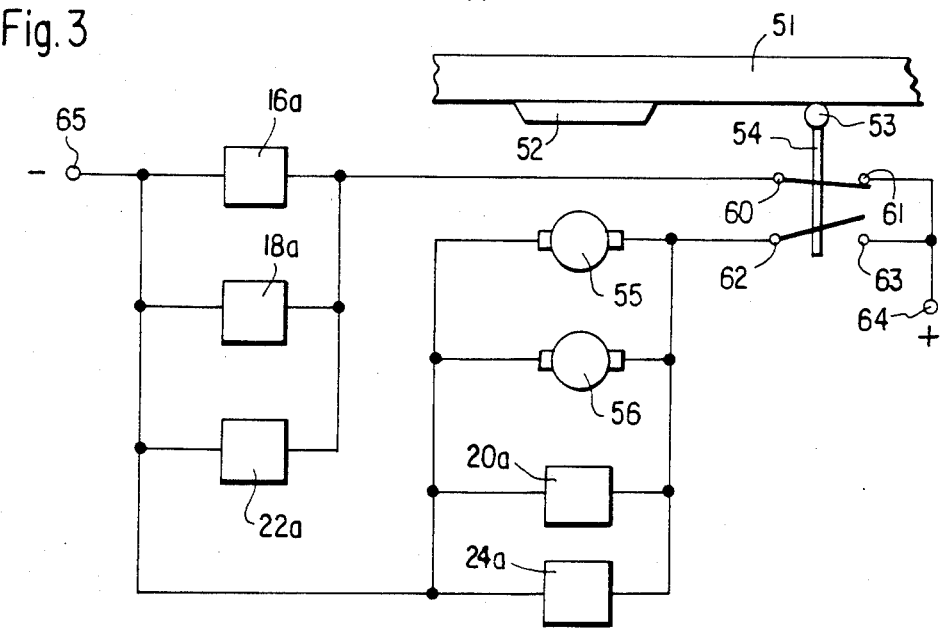
FIG. 3 is a schematic electrical control diagram for the apparatus shown in FIG. 1.

FIG. 3 is a schematic electrical diagram showing the circuit for controlling shut-off valves 16, 18, 20, 22 and 24 by means of respective solenoids 16a, 18a, 20a, 22a and 24a. The connections to motors 55 and 56 which control the movement of burner 7 and deflection sheet 45 are also shown.

When the burner 7 is travelling between the rollers 2, the sensor 53 rides on the control rail 51 causing switch arm 54 to be in its upper position thereby electrically connecting terminals 60 and 61 and opening the connection between terminals 62 and 63. Consequently, solenoid valves 16a, 18a and 22a are energized by a voltage applied across terminals 64 and 65 thereby opening their respective valves 16, 18 and 22 causing the cutting oxygen, heating oxygen and heating fuel to flow to burner 7 in the amounts required for cutting as determined by regulating valves 17, 19 and 23. Bypass shut-off valve solenoids 20a and 24a are deenergized closing the associated valves 20 and 24. Also, motors 55 and 56 are deenergized causing burner 7 to be in its vertical position and deflection sheet 45 at a position outside the gas stream emanating from nozzle 8.

When the burner 7 approaches a roller 2, the sensor 53 is displaced downward by the leading edge of cam 52 thereby opening the connection between terminal 60 and 61 and closing the connection between terminal 62 and 63. As a result, the cutting oxygen shut-off valve 16, the heating oxygen main shutoff valve 18 and the heating fuel main shut-off valve 22 are closed and the heating oxygen and heating fuel bypass valves 20 and 24 opened by their respective solenoids. Thus, the supply of cutting oxygen to the burner is cut off and the supplies of heating oxygen and fuel reduced to amounts determined by the bypass regulating valves 21 and 25.

Upon reduction of the pressure in the cutting oxygen channel 40 due to the closing of valve 16, the fast-venting valve 28, 28a or 28b, depending upon whether the embodiment of FIGS. 2A, 2B or 2C is employed, opens thereby venting the cutting oxygen to the atmosphere; consequently, no cutting can take place and the rollers are not damaged. In addition, energization of motors 55 and 56 pivots the burner 7 away from the vertical position and swings the deflection sheet 45 into the path of the gas stream from nozzle 8 thereby further protecting roller 2.

When the sensor 53 rolls off the trailing edge of cam 52 motor 55 returns the burner 7 to its original position, motor 56 swings deflection sheet 45 out of the gas stream from nozzle 8, valves 16, 18 and 22 are opened restoring the flow of cutting oxygen and the full flow of heating oxygen and fuel, and bypass valves 20 and 24 are closed.

The present invention permits optimization of the quality of the billet cuts. Since shut-off valve 16 is disposed in the cutting oxygen supply line 10 immediately upstream from burner head 9, there is initially little or no after-flow of cutting oxygen from the relatively long line leading from control panel 15 to burner head 9. Moreover, during the pauses, the burner is supplied only with a minimum quantity of heating oxygen and fuel coming through bypass conduits 11c and 12c so that only a reduced pilot flame is maintained and any remaining cutting oxygen from the region between shut-off valve 16 and nozzle 8 can escape through the fast-venting valve 28, with deflection sheet 45 completely protecting the cut groove in billet 1 from the influence of any small amounts of gas present.

Thus, the flame-cutter according to the invention avoids damage to support roller 2 of roller bed 1 without widening the cut groove in workpiece 1 or otherwise changing its shape.

It will be understood that the above description of the present invention is susceptible to various modifications, changes and adaptations, and the same are intended to be comprehended within the meaning and range of equivalents of the appended claims.

What is claimed is:

1. A flame-cutter for separating a moving billet produced by a continuous caster wherein said billet is supported by at least one billet supporting roller, comprising a burner supported for synchronous movement with said billet, said burner having a nozzle and moving along with said billet during the separation process in the direction of said billet advance;

means for supplying cutting oxygen to said burner;

means for interrupting said supply of cutting oxygen to said burner when said burner passes over each of said billet supporting rollers; and fast-venting means coupled to said burner for reducing the amount of cutting oxygen escaping from said nozzle after interruption of said supply of cutting oxygen, whereby damage to said supporting rollers is minimized and a narrow optimized groove is cut in said billet during said separation.

2. A flame-cutter as defined in claim 1 wherein said means for supplying cutting oxygen to said burner is a cutting oxygen supply line connected to a source of cutting oxygen, and wherein said means for interrupting said supply of cutting oxygen to said burner is a cutting oxygen shut-off valve connected in said cutting oxygen supply line downstream from said source in the direction of oxygen flow.

3. A flame-cutter as defined in claim 2 wherein said cutting oxygen shut-off valve is positioned in said cuttingoxygen supply line immediately upstream from the connection of said cutting oxygen supply line to said burner.

4. A flame-cutter as defined in claim 3 wherein said cutting oxygen shut-off valve is a solenoid-actuated valve actuatable by remote control.

5. A flame-cutter as defined in claim 3 wherein said burner further comprises a fast-venting valve located in the cutting oxygen supply line downstream from said cutting oxygen shut-off valve, said fast-venting valve opening when the pressure of said cutting oxygen in said burner decreases to a predetermined value as a result of the shut-off of the supply of cutting oxygen, the flow of cutting oxygen after shut off being thereby significantly reduced.

6. A flame-cutter as defined in claim 5 wherein said fast-venting valve is located in said burner upstream from said nozzle.

7. A flame-cutter as defined in claim 5 wherein said fast-venting valve is located in the nozzle of said burner.

8. A flame-cutter as defined in claim 1 wherein said nozzle comprises a valve body having a cutting oxygen channel centrally disposed therein, a fuel gas mixture bore surrounding said cutting oxygen channel and a transverse bore branching from said cutting oxygen channel, and wherein said fast-venting means is coupled to said transverse bore, said nozzle being short and emitting a narrow cutting jet which produces a relatively narrow groove in said billet.

9. A flame-cutter for separating a moving billet produced by a continuous caster wherein said billet is supported by at least one billet supporting roller, comprising a burner supported for synchronous movement with said billet, said burner having a nozzle and moving along with said billet during the separation process in the direction of said billet advance;

a cutting oxygen supply line coupling a source of cutting oxygen to said burner, said cutting oxygen supply line having a cutting oxygen shut-off valve immediately upstream from said burner and a cutting oxygen regulating valve at a control location, said regulating valve controlling the amount of cutting oxygen reaching said burner when said shut-off valve is open to permit cutting of said billet;

a heating oxygen supply line coupling a source of heating oxygen to said burner, said heating oxygen supply line including main heating oxygen shut-off and regulating valves at said control location for controlling the amount of heating oxygen reaching said burner during cutting of said billet; and bypass heating oxygen shut-off and regulating valves in parallel with said heating oxygen main shut-off and regulating valves for controlling the amount of heating oxygen reaching said burner when said burner is in the vicinity of a roller;

a heating fuel supply line coupling a source of heating fuel to said burner, said heating fuel supply line including main heating fuel shut-off and regulating valves at said control location for controlling the amount of heating fuel reaching said burner during cutting of said billet; and bypass heating fuel shut-off and regulating valves in parallel with said heating fuel main shut-off and regulating valves for controlling the amount of heating fuel reaching said burner when said burner is in the vicinity of a roller;

sensor means for providing a signal when said burner is in the vicinity of a roller;

control means operated by said sensor means for opening said cutting oxygen, main heating oxygen and main heating fuel shut-off valves and closing said bypass heating oxygen and bypass heating fuel shut-off valves when said billet is being cut, said control means further closing said cutting oxygen, main heating oxygen and main heating fuel shut-off valves and opening said bypass heating oxygen and bypass heating fuel shut-off valves when said burner is in the vicinity of a roller, said cutting oxygen, main heating oxygen and main heating fuel regulating valves controlling the amount of gas reaching said burner when said billet is being cut and said bypass heating oxygen and bypass heating fuel regulating valves reducing and controlling the amount of gas reaching said burner when said burner is in the vicinity of a roller; and a fast-venting valve located downstream from said cutting oxygen shut-off for valve venting the cutting oxygen after closing of said cutting oxygen shut-off valve, said fast-venting valve opening when the pressure therein is decreased below a predetermined value, whereby damage to said supporting rollers is minimized and a narrow optimized groove is cut in said billet during said separation.

10. A flame-cutter as defined in claim 1 wherein means are provided for deflecting said burner from a vertical position upon interruption of said supply of cutting oxygen.

11. A flame-cutter as defined in claim 10 wherein the speed of said deflection is higher than the cutting speed of said burner, whereby the flame jet is interrupted.

12. A flame-cutter as defined in claim 11 wherein means are provided for returning said burner to said vertical position simultaneously with the resumption of said supply of cutting oxygen.

13. A flame-cutter as defined in claim 10 wherein said burner is pivoted about a horizontal axis in a plane transverse to the length of said billet.

14. A flame-cutter as defined in claim 1 wherein said burner is translated vertically upon interruption of said supply of cutting oxygen, whereby the flow of cutting oxygen after said interruption is minimized.

15. A flame-cutter as defined in claim 1 which further comprises a cutting oxygen deflection device, and means for moving said device into the flow of gas from said nozzle.

16. A flame-cutter as defined in claim 15 wherein said cutting oxygen deflection device is a metal deflection sheet pivotably insertable into the flow of gas from said nozzle.

17. A method of operating a flame-cutter, for separating a moving billet produced by a continuous caster wherein said billet is supported by at least one billet supporting roller, said flame-cutter having a burner with cutting oxygen, heating oxygen and heating fuel supplied thereto, comprising the steps of moving said flame-cutter in synchronism with said billet;

sensing when said flame-cutter is approaching a billet supporting roller;

interrupting said supply of cutting oxygen and reducing the supply of heating oxygen and heating fuel when the approach of said flame-cutter to said roller is sensed;

sensing the reduction in the pressure of said cutting oxygen following interruption thereof and venting any remaining cutting oxygen;

sensing when said flame-cutter has passed said billet supporting roller; and restoring said supply of cutting oxygen and increasing the supply of heating oxygen and fuel when the passing of said roller has been sensed.

18. The method as defined in claim 17 which includes the further step of moving said burner away from said billet when the approach of said flame-cutter to said roller is sensed.

* * * * *